United States Patent [19]

Jensen

[11] 4,186,874
[45] Feb. 5, 1980

[54] TARGETING THERMOSTAT
[76] Inventor: Ronald N. Jensen, 208 Greenwell Dr., Hampton, Va. 23666
[21] Appl. No.: 1,063
[22] Filed: Jan. 5, 1979
[51] Int. Cl.² .................. F23N 5/20; G05D 23/00
[52] U.S. Cl. ................. 236/46 R; 239/91
[58] Field of Search ............ 236/46 R, 47, 91 R; 337/301–305

[56] References Cited

U.S. PATENT DOCUMENTS

| | | | |
|---|---|---|---|
| 2,246,186 | 6/1941 | Prince | 236/91 R |
| 2,528,760 | 11/1950 | Marcellus | 337/303 |
| 3,979,059 | 9/1976 | Davis | 236/46 R |
| 4,106,690 | 8/1978 | Tomlinson | 236/46 R |

Primary Examiner—William E. Wayner

[57] ABSTRACT

An improvement to a building temperature thermostat is disclosed that automatically reschedules desired building temperatures. The scheduled temperature is adjusted based on time, the period of time to a desired target temperature, outside temperature, the heat capacity of the heater and the effective heat holding capacity of the structure. A variable rate of set point adjustment for warm up is detailed.

9 Claims, 4 Drawing Figures

TARGETING THERMOSTAT

BACKGROUND OF THE INVENTION

1. Field of the Invention

This invention generally relates to thermostatic devices which measure temperature inside a building and starts or stops a heating system. The control described herein adjusts the temperature set point as a function time of day, and more specifically, the economical heating of a space using temperature setback. The present invention further varies the rate of set point rise during a warm up period.

2. Description of Prior Art

Because of high energy costs it is desirable to run environmental heating systems with reduced night time temperatures in a space. Thus, thermostats are setback to lower temperatures at night or unoccupied periods to reduce heat losses from the building. This practice is well known and is documented in reports such as U.S. Government, #EDM-1023(1-77), "Energy Savings through Automatic Thermostat Controls" which show that a 10° F. night time temperature setback can save as much as 15% of annual energy consumption. Thermostats now available can provide the mechanism for the setback control but they have two major disadvantages, which are;

(a) Thermostats are usually set to bring up the temperature in a space at a fixed time; often at a time sufficient to provide warm up for the coldest expected outside temperature. Thus, unnecessarily long periods of high space temperatures ($t_r$) result in normal building operation.

(b) Heating systems such as heat pumps use energy to transfer heat contained in the outside air to the inside of a structure. Heat pumps are characterized by the ability to transfer or pump more energy into the building than it takes to run the heat pump system. However, heat pumps have capacity problems due to their size or low ambient temperature and are therefore equipped with 2nd stage heaters, usually electric resistant type. These secondary electric heaters have a low coefficient of performance where only the energy used by the heaters is delivered into the space. Thus, when using a normal setback type thermostat and when the space has cooled due to setback, a normal control's large temperature setting change will often initiate both the heat pump and the second stage resistant heaters resulting in high operating costs. Temperature setback then may not save energy costs because of the operation of second stage heaters. Manufacturers of heat pumps in fact, advise users not to use nignt setback, —see "Energy Saving Through Thermostat Setback with Residential Heat Pumps" by C. E. Bulluck, ASHRAE TRANSACTION 1978.

Overall energy conservation and lower operating costs can be achieved in heating systems using temperature setback if the thermostatic set point temperature is adjusted to start a heating system at a time sufficiently early to allow the proper warm up of a space to a time/-temperature target but without using secondary heating units. Various patents have been granted that allow optimum time start operation such as U.S. Pat. Nos. 3979059 and 4106690. Also some sophisticated marketed computerized systems such as the Johnson JC-80 Control System or the Robertshaw Model #SST-8801 Optimizer have been marketed that will establish a calculated start time based on outside temperatures. These devices and patents are electronic/mechanical and are costly and complex.

OBJECT OF THE INVENTION

It is the object of the present invention to provide a simple, inexpensive device that allows for the adjustment of thermostatic set point temperatures in a prescribed method and to thereby reduce energy operating costs. The invention allows for the use of setback temperature in the space yet will achieve a desired space temperature at a specified time. This desired time and temperature is defined as the "target". These and other objects of the invention will be readily apparent when considering the following description and the accompanying drawings.

SUMMARY OF THE INVENTION

According to the present invention, a thermostatic control is equipped with a timer driven cam that resets the temperature element to a prescribed time/temperature schedule and allows night-time setback control. The device is equipped with a secondary cam rider that is adjusted from an outside temperature sensor. The said secondary cam rider will interact with the timer's cam to raise the desired set point during warm up, at a rate in relation to the outside temperature. The desired action of the reset device is intended to be slow enough to prevent or to severely limit operation of the second stage heaters.

DESCRIPTION OF THE PREFERRED EMBODIMENT

Figure 1:
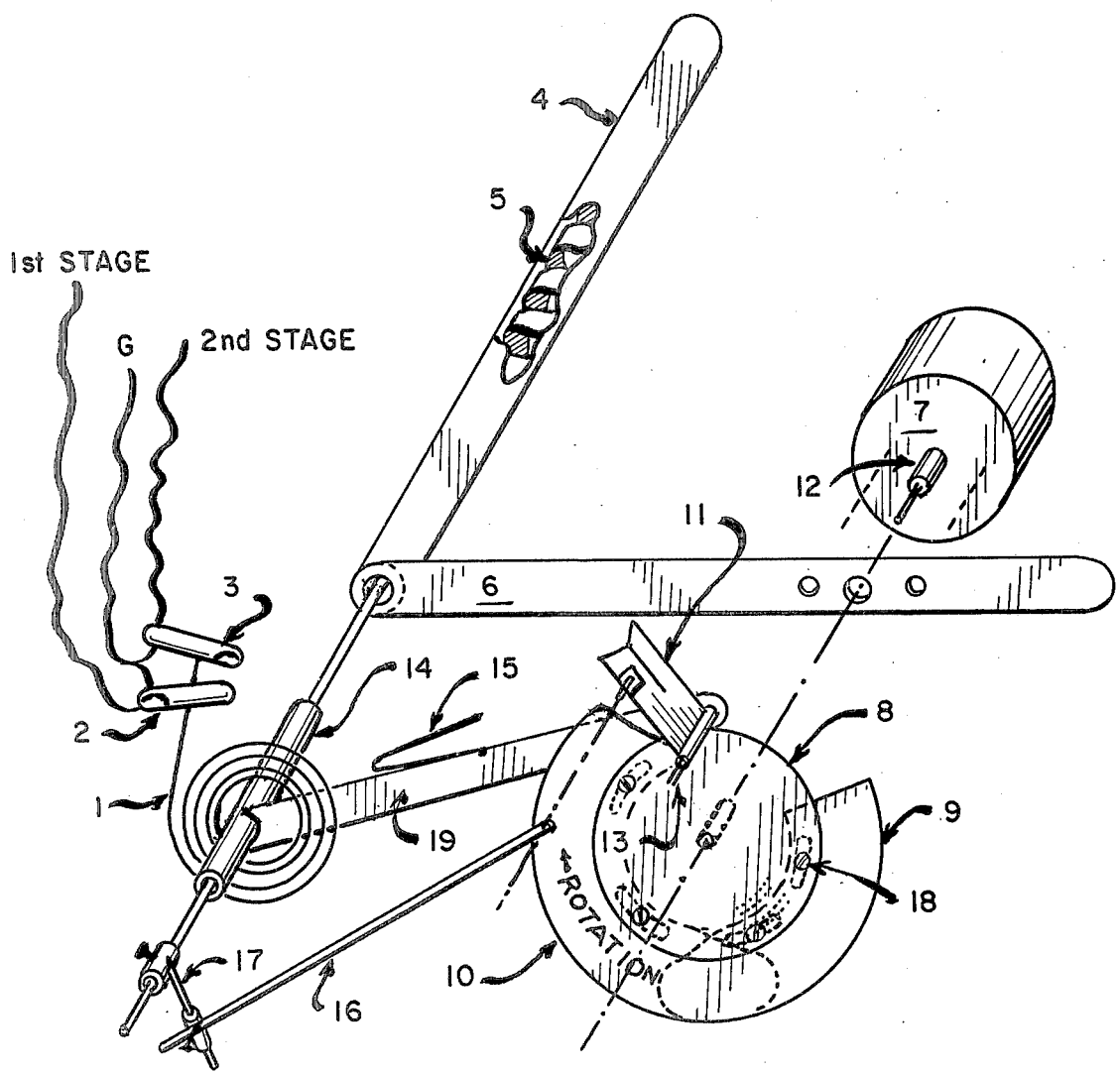
FIG. 1 is a cutaway perspective of the scheduling thermostat.

Referring to the drawings, there is shown a preferred embodiment of the invention as it would be used to control a two stage heating unit. As seen in FIG. 1, the temperature sensitive thermostatic element 1 positions the first stage 2 and second stage 3 switches depending on space temperature as in conventional thermostats. As room temperature drops from a given set point, the first stage switch 2 is activated and on a further drop in temperature the second stage switch 3 is activated.

The thermostatic element 1 is mounted on the thermostat anchor 14, which is positioned in the shaft of the outside temperature sensor 4. By moving the temperature set point arm 6, the room set point temperature is reset since the temperature cams 8, 9, and 10, are moved up or down, repositioning the temperature adjustment arm 19, the anchor 14, the thermostatic element 1, and finally the operational switches 2 and 3.

The temperature adjustment arm 19 is kept down on the temperature cams by spring 15 which is attached to either the base plate 20 or the temperature set point arm 6.

On the temperature set point arm 6 is mounted the timer motor and gear 7. Mounted on the timer's shaft 12 is the minimum temperature can 8, which also acts as a mounting plate for the stop cam 9 and the start cam 10.

As the timer rotates the temperature cams, the temperature adjustment arm 19 is positioned by pin 13 which is set to maintain the room temperature ($t_r$) during occupied periods. As time progresses, the position of stop cam 9 is advanced so that pin 13 drops off and the pin then runs on the minimum temperature cam 8. This drop of the pin 13 repositions the temperature adjustment arm 19, the anchor 14, and the thermostatic element 1 to a position calling for lower room temperatures.

As the timer continues to rotate, the pin 13 eventually runs into the start cam 10, thus moving the pin 13 gradually upwards, increasing the temperature. When the room temperature is below the new control set point, the control's switch will start the heating unit.

The start cam 10 and stop cam 9 are repositioned on the cam 8 with set screws 18, to properly start or stop the heating unit in respect to time and to establish the proper temperature difference between room ($t_r$) and minimum temperaure ($t_n$) requirements.

The cutting of the start cam is done so it will lift pin 13 in warm weather, at such a rate that will allow the first stage to warm the room and yet not bring on the second stage heaters. Thus far, the action of the thermostat as described, is rather conventional.

If a cold outside condition is encountered, a much longer warm up period is required. An exterior shaft 4 is attached to the temperature set point arm 6 which penetrates through the exterior wall so that a bimetallic temperature sensor 5 is exposed to the outside temperature. The shaft 4 is held in position by a base plate 20 but is allowed to rotate by the action of the temperature set point art 6. The bimetallic outside temperature sensor 5 rotates in respect to the outside temperature, repositioning a rider lever 17, the rider arm 16, and the secondary cam rider 11. The secondary cam rider 11 is attached to pin 13, pivoted from the temperature adjustment arm 19. The secondary cam rider 11 then runs on the temperature cam 10 during warm up.

Figure 4:
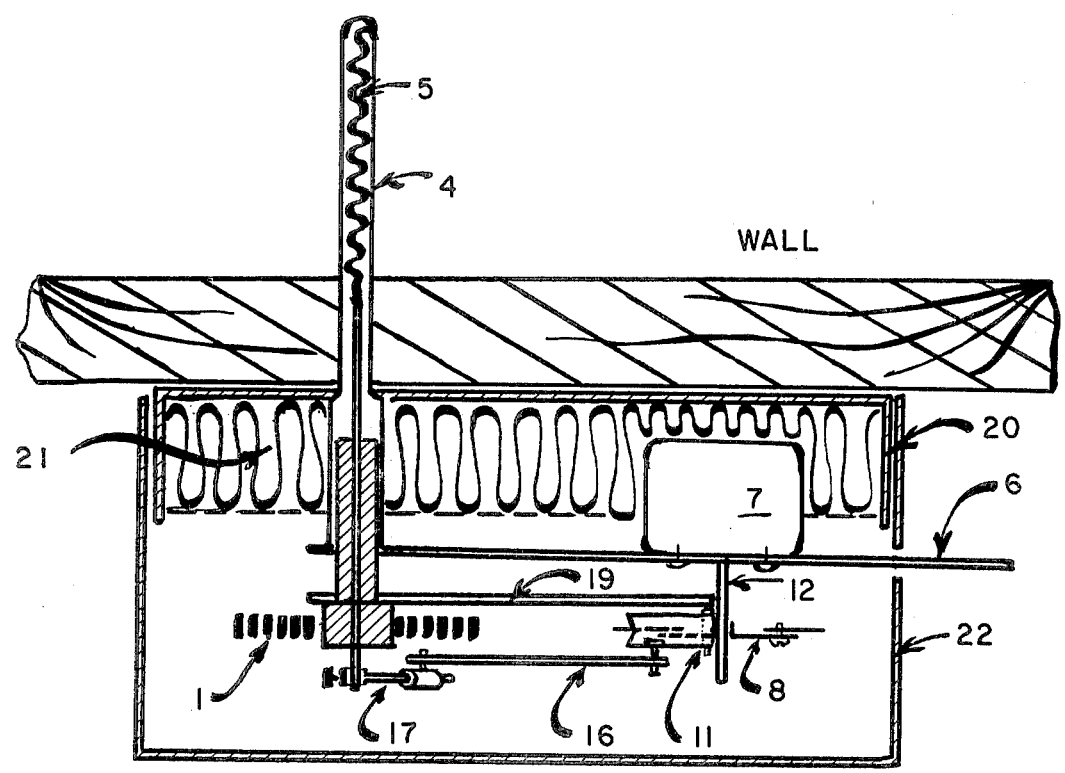
FIG. 4 is a section through the thermostat which shows the relationship of the device's components.

The thermostat is completed with a housing 22 and insulation 21, shown in FIG. 4.

OPERATION

Figure 2:
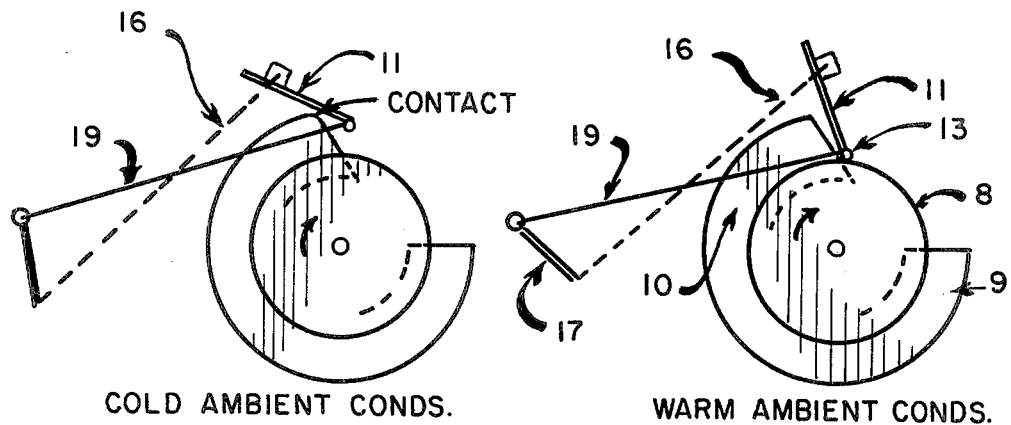
FIG. 2 is a description of the action of the temperature setpoint arm in regard to the cam for cold and warm weather.

The operation of the invention will now be described. The basic operation is best described using FIG. 2 which shows that during warm ambient conditions the secondary cam rider 11, is not affected by the start cam 10. Thus, the precut and positioned start cam establishes the set point temperature and the rate of temperature rise during warm up period by moving up pin 13 and the temperature adjustment arm 19.

With colder outside temperatures, the rider lever 17 is moved to the left (as represented on the drawing) by the thermostatic sensor 5, which in turn moves the rider lever 17, the rider arm 16, and the secondary can rider 11. The secondary cam rider is brought into position to interact with the start cam 10. As the start cam 10 rotates, it engages the secondary cam rider 11, and the temperature adjustment arm 19 moves up at an earlier time, resetting the thermostat element to a higher set point temperature. Although the temperature set point begins to rise at an earlier time with lower outside temperatures, the completed temperature rise to the desired room temperature ($t_r$) will always be at the target time.

Figure 3:
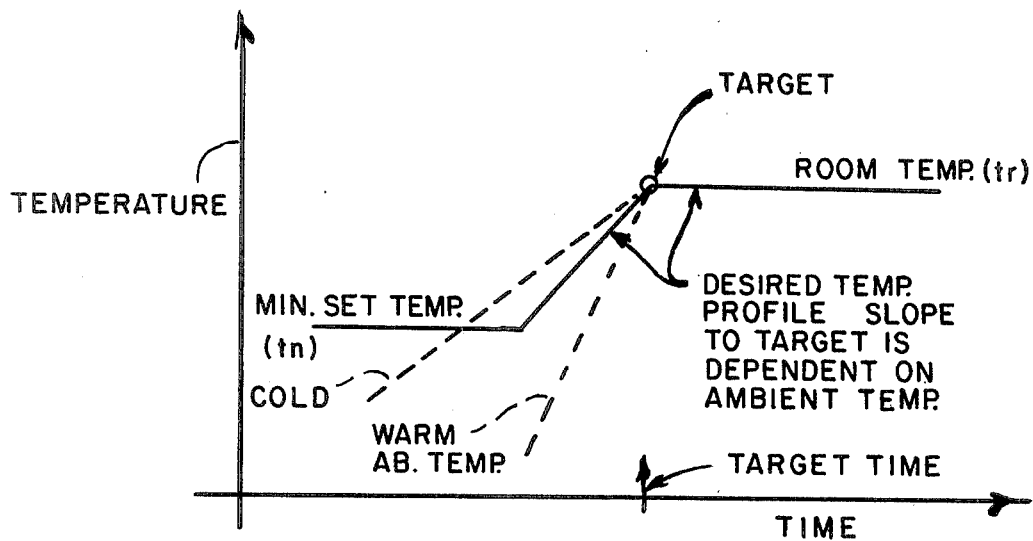
FIG. 3 is a graph showing the desired relationship of the controlling temperature and time as a function of outside temperature.

FIG. 3 shows in graphic form the desired action of the present invention. Warm conditions cause the set point temperature to rise in a very short time to the final desired room time/temperature target. Colder conditions cause a much greater period for warm up but will not alter the target's time/temperature requirement.

Adjustment of the temperature set point is made by changing the set point arm 6. This action also resets the rider lever so that the respective position between the set point and secondary cam rider is not altered. The calibration of the thermostat can be made by a housing located indicator at the end of the set point arm 6.

The secondary cam rider 11 is adjusted by repositioning the rider lever 17 on the shaft of the outside temperature sensor 5. The sensitivity of the secondary cam rider may be adjusted by the position between the rider lever 17 and the rider arm 16. The more sensitive control needed, the longer the rider lever 17; For instance, a larger heating unit and a low effective heat capacity in the structure should be given a faster warm up cycle, thus the rider lever 17 should be shortened.

It will be understood that the foregoing description is of the preferred embodiment of the invention and is therefore merely representative. Obviously, there are many possible variations and modifications of the present invention in light of the above teachings. For example:

1. A clock may be added to the basic invention to be driven from the timer.
2. For operation with a continuous room temperature ($t_r$), a lifting cam may be mounted on the temperature set point arm 6, to lift and position the temperature adjustment arm 19 to the position normally found when pin 13 is riding on the start or stop cam. If a continuous low operating temperature is required, the said lifting cam can be activated and the set point arm 6 moved to the desired lower temperature position.
3. An outside liquid or gas thermostatic device working through a capillary tube to a bellows, or a pneumatic temperature sensor working through an air line to a bellows, or a temperature sensor sending an electrical signal back to a small resistance heater operating a bimetallic element may be attached to the rider lever 17 to activate the secondary cam rider 11. This is necessary if extra thick walls are encountered or inside wall mounting of the thermostat is desired.
4. A "cooling" switch and accessories can be incorporated so the thermostat can be used for full-year operation.
5. Three or more stages of heat could be offered on the thermostatic element.
6. The timer can be electric, battery, spring or spring/electric driven.
7. Secondary curves can be cut into the cam or bent into the secondary cam rider to meet requirements of varied temperature profiles.

What I claim is,
1. A thermostatic control that operates a heating system to regulate temperature to a prescribed schedule, comprising
   a switch or switches operated from a temperature sensitive element which operates a heating system depending on the difference between the space temperature and the scheduled space temperature setting, and a device which modifys the space temperature setting of the control by adjustment of the said temperature sensitive element through a temperature adjustment arm, and a timer driven cam that repositions the said temperature adjustment arm in a prescribed manor, and an outside sensor that repositions a rider lever in respect to the ambient temperature, and a secondary cam rider pivoted on the said temperature adjustment arm which is positioned by the said outside temperature sensor's rider lever and operating so that the cam rider interacts with the timer driven cam, and which varies the rate of change to the set point control during the heating system's warm up period in respect to the outside temperature.

2. A device according to claim 1 which produces a night setback from the interaction of a temperature adjustment lever with a timer driven cam and positions the set point to a prescribed temperature and a desired time.

3. A device according to claim 1 that allows only sufficient time to warm a space to a desired target temperature at a prescribed time by the interaction of a secondary cam rider with the temperature cams.

4. A control means according to claim 1 that establishes a rising temperature schedule from the interaction of the timer cam and a secondary cam rider during the warm up period and which, if circumstances have resulted in warm space conditions, the thermostatic element positions the switches so not to allow the heating unit to be activated until actual space conditions are below the established but varying set point temperature.

5. A control means according to claim 1 that establishes a rising temperature schedule from the interaction of the timer cam and a cam rider during the warm up period and which, if circumstances have resulted in cold space conditions, the thermostatic element positions the first stage switch to allow the heating unit to be activated, and if space conditions are cold enough, to activate the second stage switch and its respective heater.

6. A device according to claim 1 that by the movement of a single temperature set point arm resets the space set point temperature and the outside temperature element.

7. A device according to claim 1 that is equipped with adjustable cams so that temperature differentials between the night time and the occupied period temperature can be established and so the time factor of setback and target time can be varied.

8. A thermostatic device which operates a heating system through electrical swiches controlled from a temperature element that is reset to a prescribed time/temperature schedule by timer driven cams and a temperature adjustment arm from which is pivoted a secondary cam rider that produces a variable rate of rise to the set point temperature during warm up period in respect to the outside temperature and where the said secondary cam rider is adjusted by a bellows or bimetallic device that is reset by the action of an outside temperature sensor in respect to ambient temperatures.

9. A device according to claim 8 that adjusts the thermostat warm up period in respect to the capacity of the heating unit and the heat holding capacity of the space by the positioning of the said secondary cam rider through a rider arm onto a lever which is positioned by a temperature set point arm and activator which is sensitive to outside temperature.

* * * * *